United States Patent [19]

Vollhardt

[11] 4,309,196

[45] Jan. 5, 1982

[54] COAL GASIFICATION APPARATUS

[75] Inventor: Frohmut Vollhardt, Siegen-Bürbach, Fed. Rep. of Germany

[73] Assignee: M.A.N. Maschinenfabrik Augsburg-Nürnberg Aktiengesellschaft, Oberhausen, Fed. Rep. of Germany

[21] Appl. No.: 216,251

[22] Filed: Dec. 15, 1980

[30] Foreign Application Priority Data

Dec. 19, 1979 [DE] Fed. Rep. of Germany ....... 2951153

[51] Int. Cl.³ .............................. C10J 3/48; C10J 3/52
[52] U.S. Cl. ........................................... 48/77; 48/67; 48/69; 55/269; 122/7 R; 122/32
[58] Field of Search ................... 48/67, 69, 77; 122/5, 122/7 R, 32; 55/269

[56] References Cited

U.S. PATENT DOCUMENTS 4,202,672  5/1980  Schurman ................................ 48/77
4,220,469  9/1980  Tippmer ................................. 48/202
4,248,604  2/1981  Woldy et al. ........................ 122/7 R

FOREIGN PATENT DOCUMENTS 2705558  8/1978  Fed. Rep. of Germany .......... 48/77
673164   6/1952  United Kingdom .

*Primary Examiner*—Peter F. Kratz
*Attorney, Agent, or Firm*—Toren, McGeady & Stanger

[57] ABSTRACT

Apparatus for purification of synthesis gas produced by coal gasification is provided with a vertical gas distribution chamber which is internally pressurized and within which the synthesis gas leaving the reactor is cooled. The chamber is formed with a gas take-off line which opens into the gas distribution chamber and extends therefrom at an angle, the gas take-off line leading to a serially connected waste heat boiler. A coolant bath is contained in a lower portion of the gas distribution chamber and a heat exchanger is formed in this lower portion by tube coils which are arranged in the wall of the distribution chamber defining the lower portion.

8 Claims, 2 Drawing Figures

COAL GASIFICATION APPARATUS

The present invention relates generally to coal gasification apparatus and more particularly to apparatus for purifying the synthesis gas produced by coal gasification. Generally, speaking, apparatus of the type to which the present invention relates involves a generally vertically extending gas distribution chamber which is internally pressurized into which the synthesis gas leaving a reactor is introduced in order to be cooled.

Apparatus known from the prior art, for example German Offenlegungsschrift No. 25 56 370 for the purification of synthesis gas produced from coal gasification involves an arrangement wherein the synthesis gas leaving the reactor is cooled to a temperature at which liquid slag droplets of the synthesis gas are formed which are capable of being converted into slag grains during their movement in the apparatus.

The present invention is based upon a prior development disclosed in German Patent Application No. P 29 33 548.6-43 wherein an apparatus of this type is disclosed which includes a coolant bath provided in the lower portion of the gas distribution chamber so that solid particles separated from the gas flow in the gas distribution chamber will fall into this coolant bath. In this case, cooling bodies project into the flow path of the gas in the gas distribution chamber, the cooling bodies forming cooling surfaces with the coolant of the bath being admitted to the cooling bodies.

The present invention is based upon the task of further development of apparatus of this generic type in such a manner that the temperature of the gas flow conveyed to the waste heat boiler arranged at the output of the apparatus can be varied within wider limits. Furthermore, the invention is directed toward the provision of means which make it possible to control the amount of the gas flow conveyed out of the gas distribution chamber into the waste heat boiler connected in the outlet wherein it must be considered that the gas flow is under a pressure of 40–80 bar and still has a temperature of 650° to 800° C. at the transition to the serially connected waste heat boiler.

SUMMARY OF THE INVENTION

Briefly, the present invention may be described as apparatus for the purification of synthesis gas produced during coal gasification comprising a vertical gas distribution chamber which is internally pressurized and wherein the synthesis gas leaving the reactor is cooled, a gas take-off line which opens into said gas distribution chamber and which extends at an angle therefrom to a serially connected waste heat boiler, and a coolant bath contained in the lower portion of the gas distribution chamber, said lower portion containing the coolant bath being arranged to receive a heat exchanger which is formed by tube coils located at the wall of the lower portion of the gas distribution chamber.

As a result of the arrangement of the heat exchanger in the lower portion of the gas distribution chamber which receives the coolant, the temperature of the coolant bath may be essentially controlled. For this purpose, it is only necessary to actuate the control element in the supply line of the heat exchanger.

In a second embodiment of the invention, there is provided an additional lateral gas take-off line wherein a controllable portion of the gas flow may be guided through the coolant bath. In this embodiment, evaporation of the coolant bath is prevented by controlling the temperature of the bath by means of the heat exchanger in the coolant bath. Since the heat exchanger forms, in the lower portion of the gas distribution chamber, a heating surface of a feed water heater, a substantial portion of the heat energy is recovered.

Additionally, by guiding a portion of the total amount of the gas flow through the coolant bath and by regulation of the temperature of the coolant bath, the gas flow can be provided with a desired water content as may be required for various chemical processes such as, for example, the production of ammonia.

The arrangement of the heat exchanger at the walls of the lower portion of the gas distribution chamber which receives the coolant does not impair the removal or drawing off of soot and slag particles from the coolant bath and sinking of the solid particles in the coolant bath is not impaired by the heat exchanger.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENT

Figure 1:
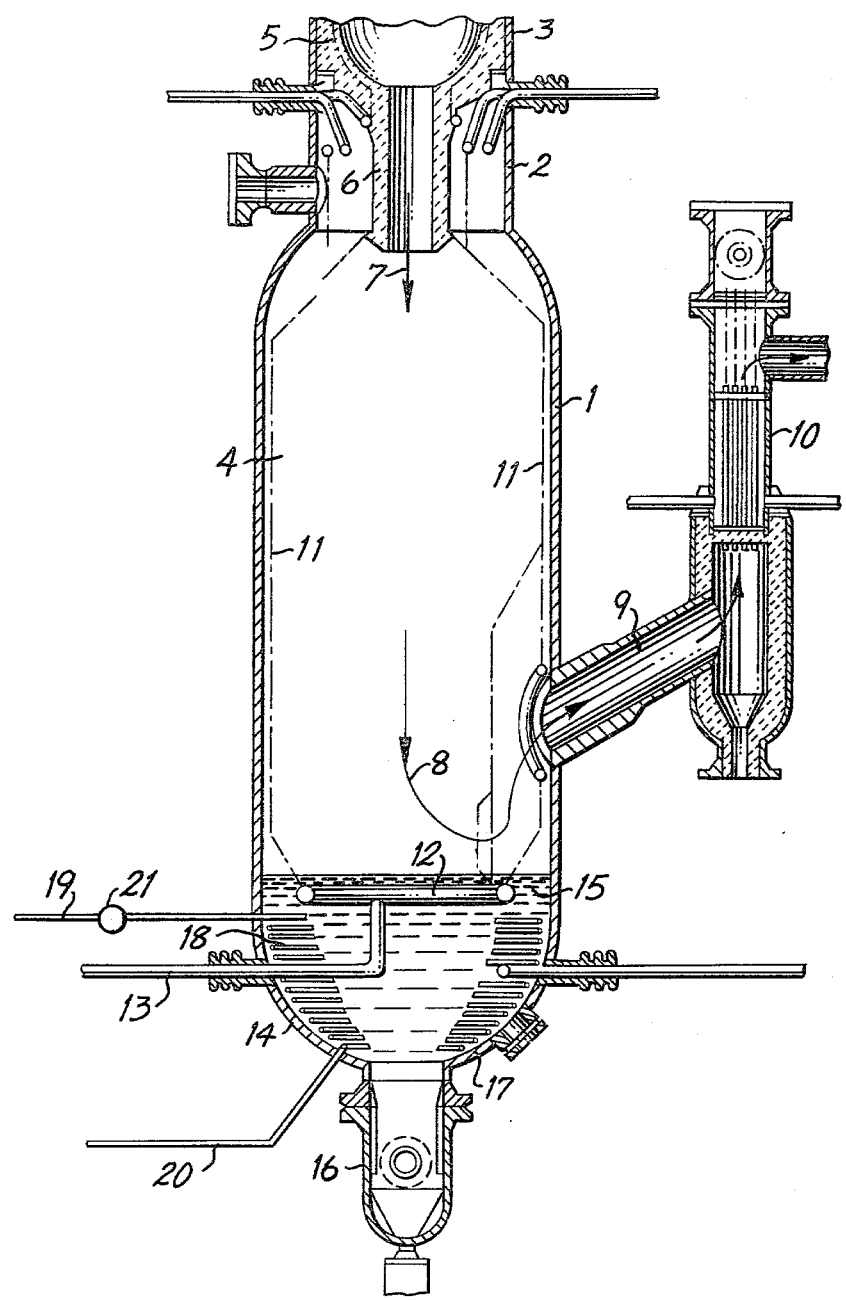
FIG. 1 is a sectional elevation showing a first embodiment of the invention including a lateral gas take-off line in flow communication with a serially connected waste gas boiler.

Referring now to the drawings and particularly to FIG. 1 wherein there is depicted the first embodiment of the invention, the invention is shown as comprising a device for the purification of synthesis gas which includes a cylindrical outer jacket 1 having an upper, narrower portion 2 upon which there is placed a part 3 of the reactor from which the synthesis gas is received, with the narrow part 2 forming together with the appropriate portion of the reactor a transition line from the reactor into the gas distribution chamber of the apparatus. A reactor lining 5 may be connected with a short piece of pipe 6 which projects into a gas distribution chamber 4 defined within the outer jacket 1.

The flow of gas reaches the gas distribution chamber in a direction indicated by the arrow 7 and from there, in the embodiment according to FIG. 1, the gas flows into a gas take-off line 9 in a direction indicated by the arrow 8. From this point, the gas is conducted to a serially connected waste heat boiler 10.

Gas flow in the gas distribution chamber 4 may be cooled by spray devices which are constructed in a manner known to those skilled in the art and which are not illustrated in FIG. 1. These are provided on the same level or beneath the transition portion 2 so that solid particles present in the gas flow will solidify and drop vertically through the chamber 4. Vertical heat exchanger tubes 11 which form a closed jacket are arranged near the inside of the jacket 1. The lower ends of the heat exchanger tubes 11 lead into a common annular pipe 12 which is supplied with a heat exchange medium through a pipe 13.

Vapor generated in the tubes 11 is removed at the upper end of the apparatus. The jacket of the heat exchanger tubes 11 is appropriately interrupted near the gas take-off line 9.

The lower portion 14 of the cylindrical outer jacket 1 is constructed with a bell-shaped configuration in the form of a pot or container within which a liquid bath 15 is provided. The level of the bath 15 is maintained higher than the level of the pipe 12. A collecting container 16 is connected beneath the lower portion 14 of the jacket 1. The container 16 operates to receive solid particles which have been separated from the liquid bath 15 and which have sunk therethrough. These solid particles may be drawn off from the container 16.

In the lower portion 14 of the apparatus, a heat exchanger 18 is arranged near a wall 17 of the apparatus. Heat exchange medium is supplied to the heat exchanger 18 through a pipe 19 and heated heat exchange medium is drawn off through a pipe 20. A control element 21 is arranged in the cold line 19.

The control element 21 may be either a valve or it may be constructed as a pump.

When the temperature of the gas flow in the gas distribution chamber 4 rises and if, with a constant amount of gas, gas of a lower temperature is to be supplied to the serially connected waste heat boiler, the flow rate through the heat exchanger 18 can be throttled so that the liquid in the bath 15 in the lower portion 14 of the apparatus will evaporate and so that the heat of evaporation may be removed from the gas flow. The pipes 19 and 20 are preferably connected to a feedwater container.

In the embodiment according to FIG. 2, there is again provided the gas distribution chamber 4 which is surrounded by a jacket of heat exchanger tubes 11 which in turn again is surrounded by the outer jacket 1. On the opposite side of the lateral gas take-off line 9, another gas take-off line 30 is provided which opens into the cylindrical jacket 1 of the apparatus. The gas take-off line 30 is arranged in such a manner that the level 31 of the liquid bath 15 which is above the annular pipe 12 extends further into the gas take-off line 30. It is also possible to provide other arrangements of the parts which will be suitable for conducting gas flow entirely or partially from the gas distribution chamber 4 through the liquid bath 15 into the gas take-off line 30.

Figure 2:
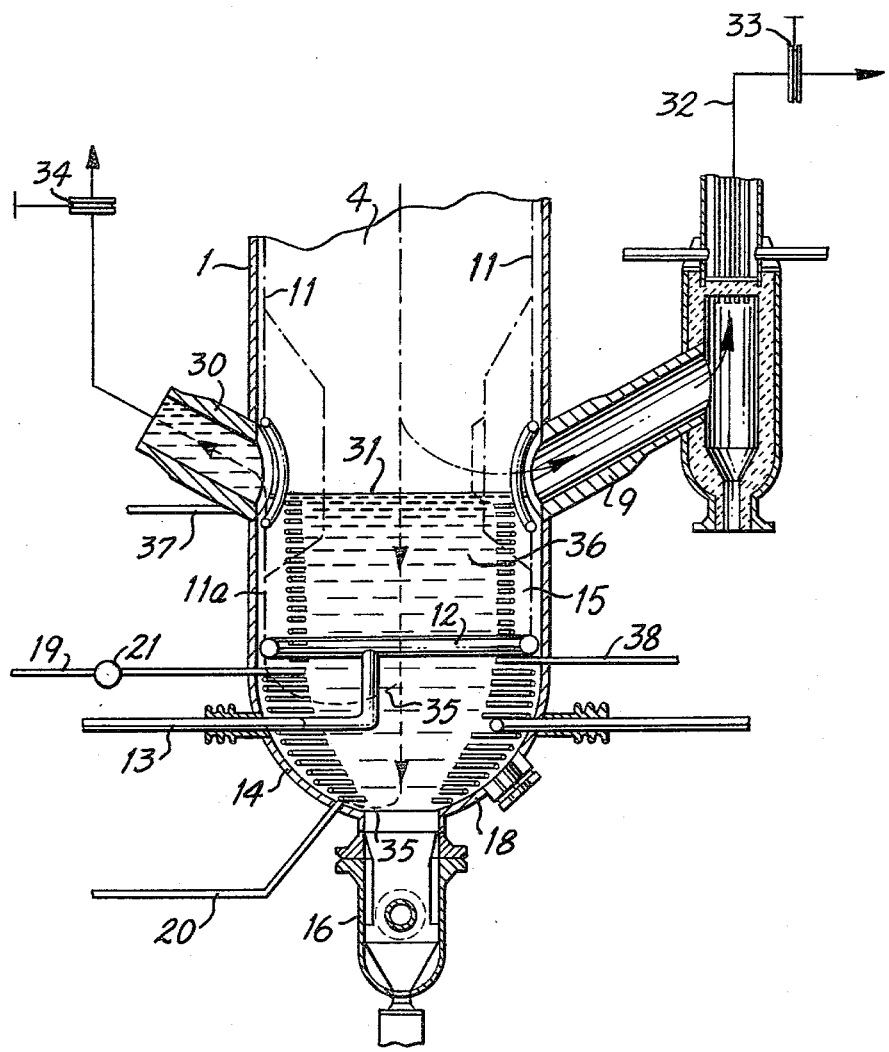
FIG. 2 is a sectional elevation of a second embodiment of the invention which includes an additional gas take-off line.

In FIG. 2, the lower portion 14 of the jacket 1 of the apparatus is again formed with a tube coil heat exchanger 18 near the wall thereof as in FIG. 1. The other portions of the apparatus of the embodiment according to FIG. 2 in the lower portion of the heat exchanger correspond generally to the arrangement depicted in FIG. 1.

A control element 33 may be arranged in a suitable manner in the gas take-off line 32 connected to the waste heat boiler 10 arranged in flow communication with the line 9. The control element 33 may be operated to ensure that the gas flow will partially or entirely reach the line 9 or the line 30 from the gas distribution chamber after the gas, or the partial gas flow, has passed through the bath 15. When the gas flow is conducted through the bath 15 it takes up during this time a more or less great quantity of liquid vapor and in order to prevent evaporation of the liquid of the bath at this time the bath liquid is cooled by means of the heat exchanger 18.

The liquid level in the portion 14 can be controlled by the supply of liquid. Since the pressure in the gas take-off line 32 and in the subsequent line 30 to the feedwater heating boiler is about 0.3 to 0.5 bar lower than in the gas distribution chamber 4, the level of the liquid in the bath 15 in the gas take-off line 30 is at a corresponding height.

In order to be able to control gas flow from the gas distribution chamber 4 to the line 30, a control element 34 is arranged in the gas line 30. By means of the control element 34 a more or less large amount of the gas flow may be conducted in the direction of an arrow 35 through the liquid bath 15. The extent of evaporation of the liquid in the bath 15 is in this case controlled by a temperature control of the bath by means of the control element 21 of the heat exchanger 18 which is constructed as a tubular coil exchanger. Therefore, it forms a large exchanger surface area without impairing the ability of the solid particles to sink in the liquid bath.

Above the heat exchanger 18 there is provided another heat exchanger 36 having supply and take-off pipes 37, 38, with the heat exchanger 36 being controlled independently from the heat exchanger 18. This additional heat exchanger is surrounded by the lower portion 11a of the jacket of the heat exchanger tubes 11 in such a manner that gas flow entering the bath 15 is conducted through the bath at least over the height of the heat exchanger 36 and thus over approximately half the height of the bath 15.

While specific embodiments of the invention have been shown and described in detail to illustrate the application of the inventive principles, it will be understood that the invention may be embodied otherwise without departing from such principles.

What is claimed is:

1. Apparatus for purification of synthesis gas produced by coal gasification comprising a coal gasification reactor, means defining a vertical gas distribution chamber which is internally pressurized, means for conducting synthesis gas from the coal gasification reactor into said distribution chamber, means in said distribution chamber for cooling said synthesis gas, gas take-off means opening into said gas distribution chamber extending at an angle thereto and being in communication with a serially connected waste heat boiler, coolant bath means contained in a lower portion of said gas distribution chamber located below said gas take-off means, and heat exchanger means formed by tubular coils arranged at the wall of said lower portion of said gas distribution chamber located within said lower portion containing said coolant bath and a control element operatively arranged in a line supplying heat exchanger medium to said heat exchanger.

2. Apparatus according to claim 1 wherein said vertical gas distribution chamber is defined by a cylindrical jacket and wherein there is provided another gas take-off line opening into the lower portion of said cylindrical jacket.

3. Apparatus according to claim 2 wherein said another gas take-off line is arranged opposite said gas take-off line and opens into said cylindrical jacket essentially above an annular pipe located in said liquid bath for said heat exchanger means of said gas distribution chamber.

4. Apparatus according to claim 1 further comprising a control element arranged in said gas take-off line which is connected to an outlet of said waste heat boiler.

5. Apparatus according to claim 1 wherein said gas distribution chamber includes heat exchanger tubes which line said gas distribution chamber and which form a generally cylindrical jacket operating to conduct the gas flow from said gas distribution chamber into at least one of said coolant bath and said gas take-off line.

6. Apparatus according to claim 2 wherein a further control element is arranged in said additional gas take-off line.

7. Apparatus according to claim 1 wherein a second heat exchanger means is arranged above said heat exchanger means in said coolant bath, said second heat exchanger means being operated independently from said heat exchanger means.

8. Apparatus according to claim 2 further comprising second heat exchanger means arranged above said heat exchanger means in said coolant bath, said second heat exchanger means being operated independently from said heat exchanger means, with the uppermost windings of said heat exchanger means and of said second heat exchanger means being covered by said liquid bath and said uppermost windings of said second heat exchanger means being located on a level approximately equivalent to the level of said another gas take-off line.

* * * * *